(12) United States Patent
Augustine

(10) Patent No.: US 6,836,982 B1
(45) Date of Patent: Jan. 4, 2005

(54) TACTILE FEEDBACK SYSTEM FOR A REMOTELY CONTROLLED WORK MACHINE

(75) Inventor: Albert William Augustine, Oak Lawn, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/640,629

(22) Filed: Aug. 14, 2003

(51) Int. Cl.⁷ .............................. E02F 3/04; E02F 3/64; E02F 5/02; G05D 1/02; G05D 1/04
(52) U.S. Cl. .............................. 37/348; 37/414; 701/50
(58) Field of Search ................ 37/348, 347, 414–416, 37/466, 234; 701/50; 172/2–12

(56) References Cited

U.S. PATENT DOCUMENTS

| | | |
|---|---|---|
| 5,019,761 A | 5/1991 | Kraft |
| 5,448,479 A | 9/1995 | Kemner et al. |
| 5,629,594 A | 5/1997 | Jacobus et al. |
| 5,642,653 A | 7/1997 | Hutchison |
| 5,739,811 A | 4/1998 | Rosenberg et al. ......... 345/161 |
| 5,754,023 A | 5/1998 | Roston et al. ............... 318/561 |
| 6,067,077 A | 5/2000 | Martin et al. ................ 345/161 |
| 6,112,139 A | 8/2000 | Schubert et al. ................ 701/2 |
| 6,147,674 A | 11/2000 | Rosenberg et al. ......... 345/157 |
| 6,201,533 B1 | 3/2001 | Rosenberg et al. |
| 6,216,528 B1 | 4/2001 | Carrell et al. |
| 6,219,032 B1 | 4/2001 | Rosenberg et al. ......... 345/157 |
| 6,252,579 B1 | 6/2001 | Rosenberg et al. ......... 345/145 |
| 6,278,439 B1 | 8/2001 | Rosenberg et al. ......... 345/157 |
| 6,343,349 B1 | 1/2002 | Braun et al. ................. 711/154 |
| 6,360,717 B1 | 3/2002 | Chang et al. ................ 123/381 |
| 6,591,175 B2 * | 7/2003 | Numata et al. ................ 701/36 |

OTHER PUBLICATIONS

US 5,903,456, 5/1999, Schena et al. (withdrawn)

* cited by examiner

*Primary Examiner*—Christopher J. Novosad
(74) *Attorney, Agent, or Firm*—Finnegan, Henderson, Farabow, Garrett & Dunner

(57) ABSTRACT

A control system for a work machine having a hydraulic actuator is provided. An input device generates a movement signal to control the movement of the hydraulic actuator. A sensor senses a parameter indicative of a magnitude of a force exerted by the hydraulic actuator. A first controller controls the motion of the hydraulic actuator and has a first receiver that receives the movement signal and a first transmitter that transmits a force signal including an indication of the force exerted by the hydraulic actuator. A second controller is operatively connected to the input device and has a second transmitter that transmits the movement signal and a second receiver that receives the force signal. A force generator exerts a feedback force on the input device. The magnitude of the feedback force is related to the magnitude of the force.

23 Claims, 3 Drawing Sheets

TACTILE FEEDBACK SYSTEM FOR A REMOTELY CONTROLLED WORK MACHINE

TECHNICAL FIELD

This disclosure relates generally to a control system for a work machine and, more particularly, to a system and method for providing tactile feedback to an operator of a remotely controlled work machine.

BACKGROUND

Work machines, such as, for example, wheel loaders, front shovels, track loaders, backhoes, excavators, and bulldozers, are commonly used to perform earth and debris moving tasks. To assist in the performance of these tasks, a work machine may be equipped with a control device that allows the operator to control the movements of the work machine from a remote location. As described in U.S. Pat. No. 5,448,479 to Kemner et al., a radio communication link may be established between an input device and the work machine. The operator may manipulate the input device to control the motions of the work machine to perform the desired work. The movement instructions are transmitted through a radio signal to the machine, which reacts accordingly.

The work machine may be equipped with a camera to provide visual information to the operator regarding the location and operation of the work machine. The camera may provide images of the work site surrounding the work machine. The operator may view the images provided by the camera to control the work machine to complete the particular work task.

However, a camera will not always provide sufficient information to allow the operator to efficiently operate the machine. During direct, i.e. non-remote, operation of the work machine, an operator may rely on physical indications from the machine when controlling the operation of the work machine. The operator may obtain these physical indications by watching the reaction of the work machine to the lifting or moving of a particular load. The operator may also obtain these physical indications by sensing movements of the work machine housing as a load is lifted or moved. If the operator observes that the work machine is having difficulty lifting or moving a load or if the operator feels the machine housing shift unexpectedly as a load is lifted or moved, the operator may vary the operation to prevent damage to the work machine. The images provided by the camera are not capable of providing this type of physical indication to a remote operator.

The present disclosure is directed to solving one or more of the problems set forth above.

SUMMARY OF THE INVENTION

One aspect of the present disclosure is directed to a control system for a work machine that has at least one hydraulic actuator. An input device is adapted to generate a movement signal to control the movement of the hydraulic actuator. A sensor is engaged with the hydraulic actuator and senses a parameter indicative of a magnitude of a force exerted by the hydraulic actuator. A first controller is disposed on the work machine and controls the motion of the hydraulic actuator. The first controller has a first receiver that receives the movement signal and a first transmitter that transmits a force signal including an indication of the force exerted by the hydraulic actuator. A second controller is operatively connected to the input device and has a second transmitter that transmits the movement signal and a second receiver that receives the force signal. A force generator is engaged with the input device and exerts a feedback force on the input device. The magnitude of the feedback force is related to the magnitude of the force exerted by the hydraulic actuator.

Another aspect of the present disclosure is directed to a method of remotely controlling a work machine. A movement signal is transmitted from a remote input device to a controller disposed on a work machine. At least one hydraulic actuator disposed on the work machine is moved in response to the movement signal. A parameter indicative of a magnitude of a force exerted by the at least one hydraulic actuator is sensed. A force signal having an indication of the magnitude of the force exerted by the at least one hydraulic actuator is transmitted. A feedback force is exerted on the input device. The magnitude of the feedback force is related to the magnitude of the force exerted by the hydraulic actuator.

DETAILED DESCRIPTION

Figure 1:
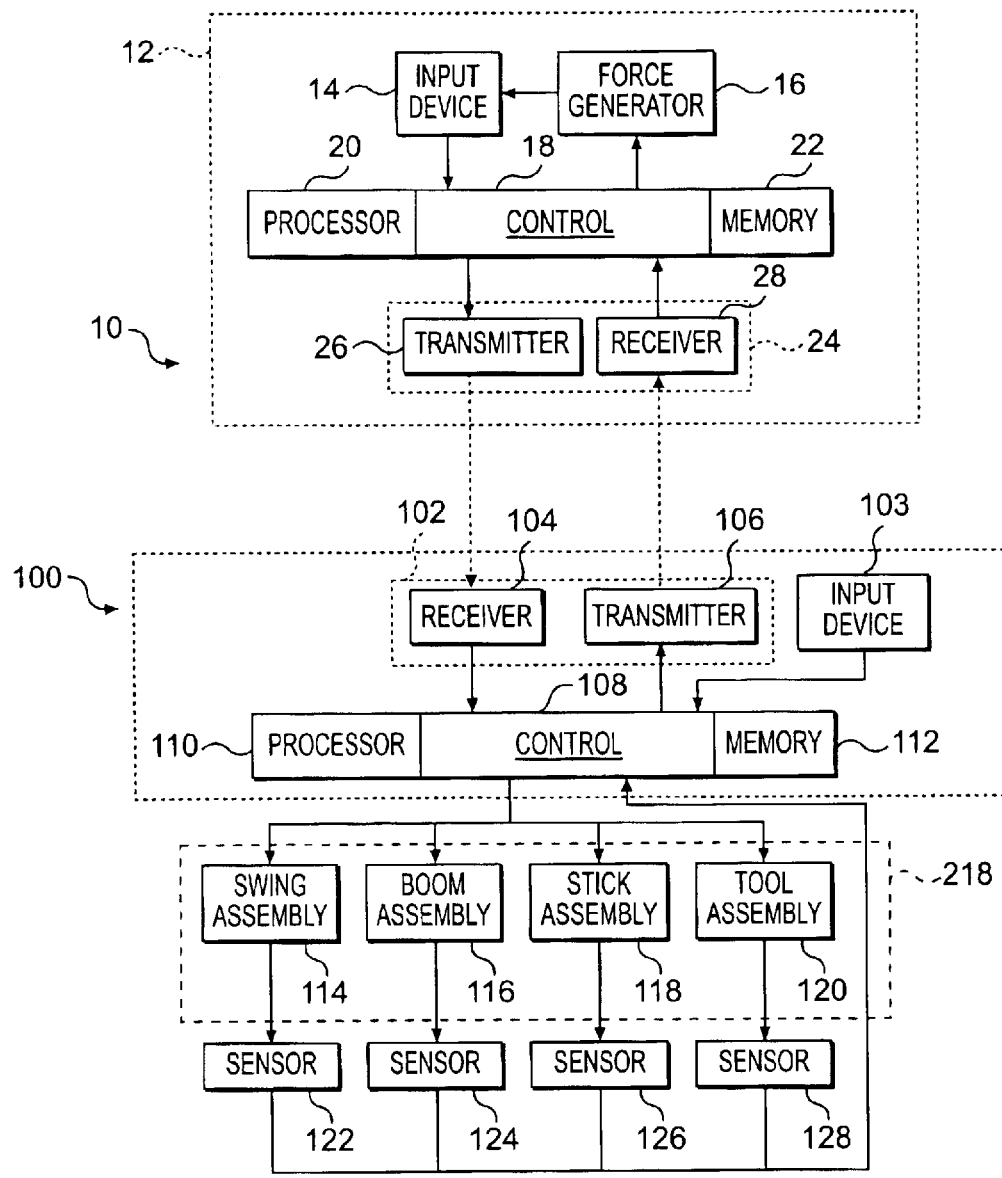
FIG. 1 is a schematic illustration of a system for providing tactile feedback in accordance with an exemplary embodiment of the present invention.

An exemplary embodiment of a control system 10 for a work machine is schematically and diagrammatically illustrated in FIG. 1. The illustrated control system 10 provides remote control capabilities for a work machine 200 (referring to FIG. 2). Control system 10 includes a force generator 16 that provides tactile feedback to an operator during remote control operation of work machine 200 (referring to FIG. 2).

As shown in FIG. 1, control system 10 includes a remote control assembly 12 that includes an input device 14. Input device 14 may have a series of input mechanisms, each of which may be manipulated to control a particular operational aspect of work machine 200. For example, input device 14 may include a joystick, control levers, push buttons, and/or another type of control mechanism that may be used to control an operational aspect of work machine 200.

In an exemplary embodiment, input device 14 may include a first joystick that may be used to control the motion of a work implement on work machine 200. Input device 14 may include a second joystick that may be used to control the motion of work machine 200 itself. One skilled in the art will recognize that input device 14 may include any number and combination of input mechanisms that are needed to control the necessary operational aspects of the particular work machine 200.

Remote control system 12 may also include a force generator 16 that is operatively engaged with input device 14. As described in greater detail below, force generator 16 may be adapted to exert a variable feedback force on input device 14. Force generator 16 may include a spring, magnet, electromagnet, solenoid, hydraulic actuator, and/or another type of mechanism that may be controlled to exert a variable feedback force on input device 14.

Remote control assembly 12 also includes a control 18. Control 18 may include a computer that has all the components required to run an application, such as, for example, a processor 20, which may be a central processing unit, a memory 22, and a secondary storage device. One skilled in the art will appreciate that this computer can contain additional and/or different components. Furthermore, although aspects of the present invention may be described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

Input device 14 and control 18 may be adapted to generate a movement signal in response to movement instructions provided by an operator. Input device 14 may monitor each of the series of input mechanisms to detect a movement indicating that the operator is providing instructions for the work machine. When such an instruction is detected, input device 14 may convert the movement of the respective input mechanism into an electronic signal. Control 18 may interpret the movements of the input mechanism to determine the desired movement of work machine and generate an appropriate movement signal for work machine 200.

For example, an operator may desire to move work machine 200 in a certain direction. To cause this movement, the operator may manipulate the appropriate input mechanism, which may be, for example, a joystick. Input device 14 detects movement of the joystick and control 18 interprets the movement of joystick. Controller 18 identifies the desired motion and generates a movement signal intended to cause the work machine 200 to move in the direction desired by the operator.

Remote control assembly 12 may also include a telemetry device 24. Telemetry device 24 may include a transmitter 26 and a receiver 28. Transmitter 26 and receiver 28 may be adapted to send and receive informational signals through radio waves. It is contemplated, however, that telemetry device 24 may be a transceiver or other type of two-way communication device. In addition, telemetry device 24 may use any type of communication media, such as, for example, light waves, lasers, infrared signals, electromagnetic signals, or acoustic signals.

Telemetry device 24 may be connected with control 18. Transmitter 26 of telemetry device 24 may be adapted to transmit the movement signal generated by control 18. Receiver 28 of telemetry device may be adapted to receive a return signal from work machine. For example, as described in greater detail below, receiver 28 may be adapted to receive informational signals from work machine 200 that indicate various operational parameters of the work machine.

Figure 2:
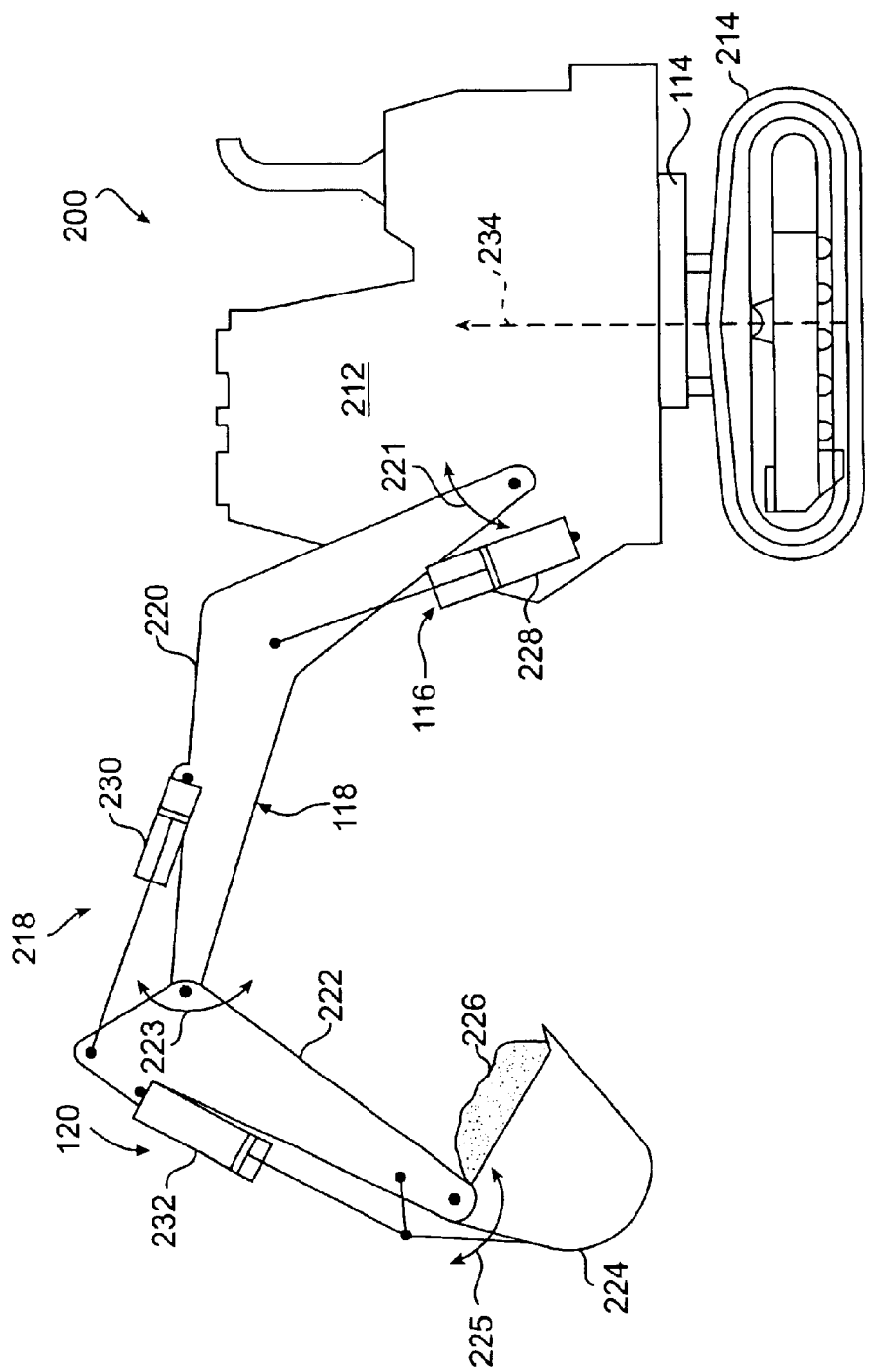
FIG. 2 is a pictorial representation of an exemplary embodiment of a work machine.

FIG. 2 illustrates an exemplary embodiment of a work machine 200 that may be controlled by remote control assembly 12. In the illustrated exemplary embodiment, work machine 200 is an excavator. It is contemplated, however, that control system 10 described herein may be used with any type of work machine, such as for example, a front shovel, a bulldozer, a backhoe, an articulated truck, or an off-highway truck.

In the exemplary illustrated embodiment, work machine 200 includes a housing 212 that is mounted on a swing assembly 114. Swing assembly 114 is configured to rotate or pivot housing 212 about a vertical axis 234. Swing assembly 114 may include a hydraulic actuator, such as, for example, a fluid motor or a hydraulic cylinder, that pivots housing 212 about vertical axis 234. Pressurized fluid may be introduced to swing assembly 114 to move swing assembly 114. The direction and rate of the introduced flow of pressurized fluid governs the direction of movement of swing assembly 114. Swing assembly 114 may also include a control valve (not shown) adapted to control the rate and direction of fluid flow to the hydraulic actuator to thereby control the direction and rate of movement of swing assembly 114.

Housing 212 and swing assembly 114 are supported by a ground engaging device 214. Ground engaging device 214 may be any type of device that is capable of providing a stable support for work machine 200 when work machine 200 is in operation. In addition, ground engaging device 214 may provide for movement of work machine 200 around a job site and/or between job sites. For example, ground engaging device 214 may be a wheel base or a track base.

Work machine 200 includes a work implement 218 that is mounted on housing 212. Work implement 218 may include a boom assembly 116, a stick assembly 118, and a tool assembly 120. Tool assembly 120 may include a work tool 224 that may be any type of mechanism commonly used on a work machine to move a load 226 of earth, debris, or other material. For example, work tool 224 may be a blade, shovel, bucket, or clamshell.

Boom assembly 116 includes a boom 220 that may be pivotally mounted on housing 212 for movement in the directions indicated by arrow 221. In another exemplary embodiment, boom 220 may be mounted directly on swing assembly 114 and housing 212 may be fixed relative to ground engaging device 214. In this alternative embodiment, swing assembly 114 would allow boom 220 to pivot about a vertical axis relative to housing 212.

A boom actuator 228 may be connected between boom 220 and housing 212 or between boom 220 and swing assembly 114. Boom actuator 228 may be one or more hydraulically powered actuators, such as, for example, fluid motors or hydraulic cylinders. Alternatively, boom actuator 228 may be any other device readily apparent to one skilled in the art as capable of moving boom 220 relative to housing 212. Pressurized fluid may be introduced to boom actuator 228 to move boom 220 relative to housing 212. The direction and rate of the pressurized fluid flow to boom actuator 228 may be controlled to thereby control the direction and speed of movement of boom 220. Boom assembly 116 may also include a control valve (not shown) adapted to control the rate and direction of fluid flow to the boom actuator 228 to thereby control the direction and rate of movement of boom 220.

Stick assembly 118 includes a stick 222 that is pivotally connected to one end of boom 220 for movement in the directions indicated by arrow 223. A stick actuator 230 may be connected between stick 222 and boom 220. Stick actuator 230 may be one or more hydraulically powered actuators, such as, for example, fluid motors or hydraulic cylinders. Alternatively, stick actuator 222 may be any other device readily apparent to one skilled in the art as capable of moving stick 222 relative to boom 220. Pressurized fluid may be introduced to stick actuator 230 to move stick 222 relative to boom 220. The direction and rate of the pressurized fluid flow to stick actuator 230 may be controlled to thereby control the direction and speed of movement of stick 222. Stick assembly 118 may also include a control valve (not shown) adapted to control the rate and direction of fluid flow to the stick actuator 230 to thereby control the direction and rate of movement of stick 222.

Work tool 224 of tool assembly 120 is pivotally connected to one end of stick 222 for movement in the directions indicated by arrow 225. A tool actuator 232 may be connected between ground engaging tool 224 and stick 222.

Tool actuator 232 may be one or more hydraulically powered actuators, such as, for example, fluid motors or hydraulic cylinders. Alternatively, tool actuator 232 may be any other appropriate device readily apparent to one skilled in the art as capable of moving work tool 224 relative to stick 222. Pressurized fluid may be introduced to tool actuator 232 to move work tool 224 relative to stick 222. The direction and rate of the pressurized fluid flow to tool actuator 232 may be controlled to thereby control the direction and speed of movement of work tool 224 relative to stick 222. Tool assembly 120 may also include a control valve (not shown) adapted to control the rate and direction of fluid flow to tool actuator 232 to thereby control the direction and rate of movement of work tool 224.

With reference to FIG. 1, a work machine control assembly 100 may be disposed on work machine 200. Work machine control assembly I 00 may include a telemetry device 102 and an input device 103. As explained in greater detail below, telemetry device 102 may be adapted to receive a remotely generated movement signal from remote control assembly 12. Input device 103 may be adapted to allow an operator to directly control the operation of work machine 200 from housing 212. Work machine control assembly 100 will therefore allow work machine 200 to be operated directly from housing 212 or from a remote location through remote control assembly 12.

Input device 103 may include one of more input mechanisms that allow the operator to directly control work machine 200. The set of input mechanisms on input device 103 of work machine control assembly 100 may be substantially similar, in number and form, to the input mechanisms on input device 14 of remote control assembly 12. Alternatively, the set of input mechanisms on input device 103 of work machine control assembly 100 may be different, in number and form, from the input mechanisms on input device 14 of remote control assembly 12.

Telemetry device 102 of work machine control assembly 100 may include a transmitter 106 and a receiver 104. Transmitter 106 and receiver 104 may be adapted to send and receive informational signals through radio waves. It is contemplated, however, that telemetry device 102 may be a transceiver or other type of two-way communication device. In addition, telemetry device 102 may use any type of communication media, such as, for example, light waves, lasers, infrared signals, electromagnetic signals, or acoustic signals.

Work machine control assembly 100 also includes a control 108. Control 108 may include a computer that has all the components required to run an application, such as, for example, a processor 110, which may be a central processing unit, a memory 112, and a secondary storage device. One skilled in the art will appreciate that this computer can contain additional and/or different components. Furthermore, although aspects of the present invention may be described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

Control 108 may control the motion of work implement 218 by controlling the motion of swing assembly 114, boom assembly 116, stick assembly 118, and tool assembly 120. In particular, control 108 may be adapted to control the position of the control valves associated with each of swing assembly 114, boom assembly 116, stick assembly 118, and tool assembly 120. Control 108 may be adapted to control the relative positions of each control valve to thereby control the rate and direction of fluid flow to the respective hydraulic actuators. By controlling the rate and direction of fluid flow through these control valves, control 108 may control the rate and direction of movement of swing assembly 114, boom assembly 116, stick assembly 118, and tool assembly 120. In this manner, control 108 may control the overall rate and direction of movement of work implement 218.

Control 108 may also control the rate and direction of movement of work machine 200 relative to the ground. Control 108 may be adapted to control the steering of the work machine and the speed and direction of movement of ground engaging device 214. In this manner, control 108 may control the movement of the work machine 200 relative to a job site.

A series of sensors may be operatively connected with work implement 218. For example, a sensor 122 may be connected with swing assembly 114, a sensor 124 may be connected with boom assembly 116, a sensor 126 may be engaged with stick assembly 118, and a sensor 128 may be engaged with tool assembly 120. Each sensor 122, 124, 126, 128, may be adapted to sense an operational parameter of the respective assembly.

In an exemplary embodiment, each sensor 122, 124, 126, 128 may be adapted to sense a parameter indicative of a force being exerted by or on the hydraulic actuator in the respective actuation assembly. Each sensor 122, 124, 126, 128 may, for example, sense a pressure representative of the pressure of the hydraulic fluid in a chamber of the respective hydraulic actuator. Each sensor may be positioned in the chamber to sense the pressure of the fluid directly. Alternatively, each sensor may be positioned in a fluid line leading to the chamber to thereby sense the pressure of the fluid indirectly.

Additional sensors may be engaged with work implement 218 to sense additional operating parameters of the respective assembly. For example, the additional sensors may be adapted to sense the rate of movement of the respective hydraulic actuator or to sense the position of the respective hydraulic actuator. Any type of sensor readily apparent to one skilled in the art may be disposed on the work implement 218 to provide this information.

Control 108 may receive and interpret the information related to the operating parameters of work machine 200 provided by sensors 122, 124, 126, 128. For example, control 108 may receive information indicative of the pressure of fluid in the hydraulic actuators of each of the swing assembly 114, the boom assembly 116, stick assembly 118, and tool assembly 120. Based on this information, control 108 may determine the force being exerted by each hydraulic actuator and/or the resultant force on work implement 218. It is contemplated that control 108 may use additional or alternative information, such as, for example, velocity information, when determining forces being exerted by each hydraulic actuator and/or the resultant force on work implement 218. In addition, control 108 may determine another operating parameter of work machine 200 such as, for example, the current power being generated by each hydraulic actuator and/or the resultant power being generated by work implement 218.

Control 108 may generate a force signal that contains information related to the current forces of the hydraulic actuators associated with work implement 218. Control 108 may also generate another type of informational signal containing information related to other operational parameters of work machine 200, such as, for example, fuel quantities, positional information, and any other type of information. Control 108 may pass this signal to transmitter 106 of telemetry device 102.

Transmitter 106 is adapted to send the force signal to telemetry device 24 of remote control assembly 12. As noted previously, transmitter 106 may send the force signal through any type of communication media, such as, light waves, sound waves, or electro-magnetics. Receiver 28 of telemetry device 24 is adapted to receive the force signal from transmitter 106 and pass the force signal to control 18 of remote control assembly 12.

Figure 3:
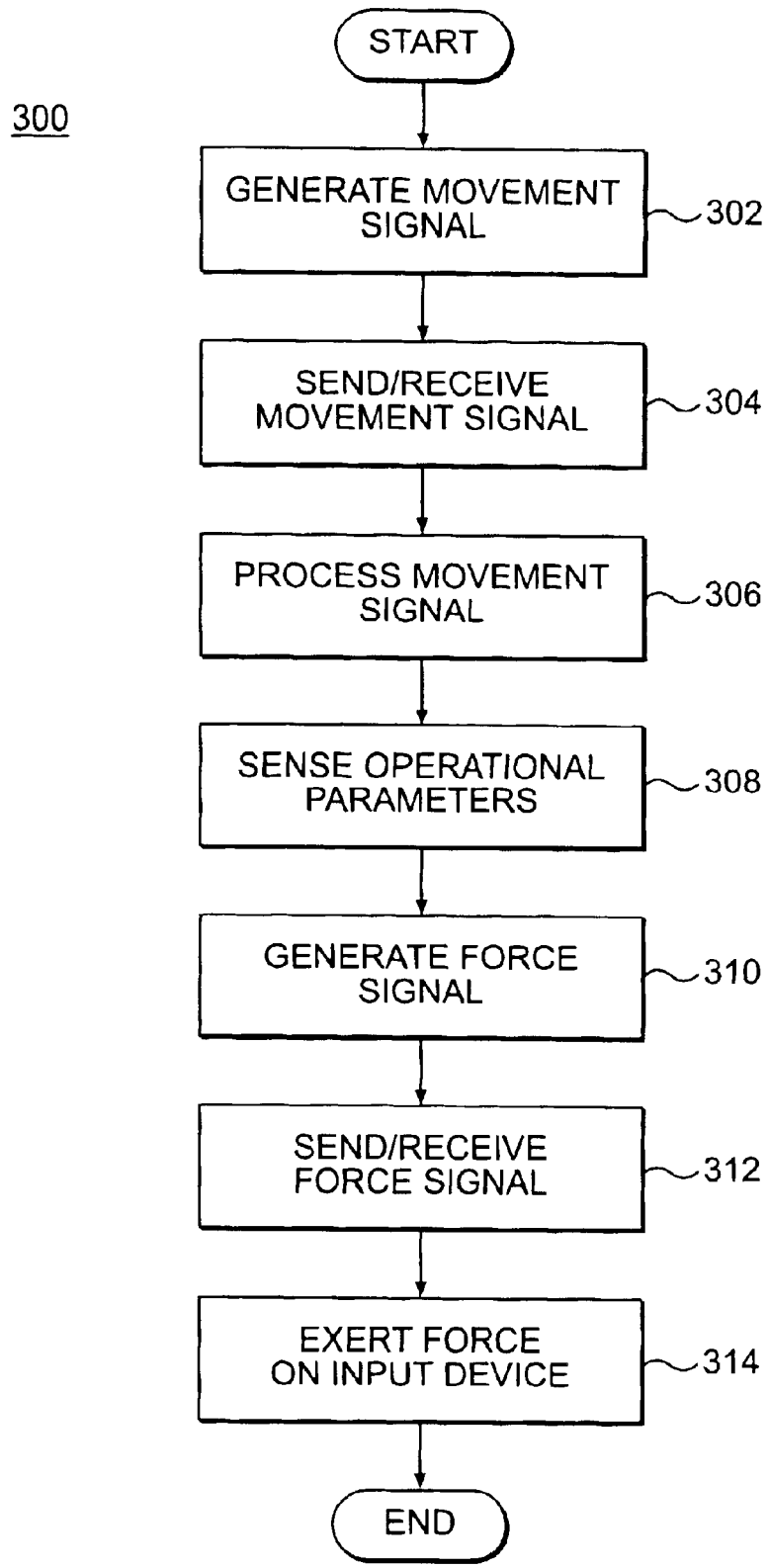
FIG. 3 is a flowchart illustrating an exemplary method of providing tactile feedback to an operator in accordance with an embodiment of the present invention.

The flowchart of FIG. 3 illustrates an exemplary method 300 of remotely controlling work machine 200. An operator may manipulate input device 14 to provide a movement instruction for work machine 200. Control 18 may receive the movement instructions, interpret the movement instructions, and generate a movement signal (Step 302).

For example, control 18 may determine which input mechanism of input device 14 was moved and in which direction. Control 18 may then determine which hydraulic actuators on work machine 200 need to be activated to achieve the movement requested by the operator. For example, operator may manipulate an input mechanism on input device 14 to cause work implement 218 to rotate about vertical axis 234 in a clockwise direction. Control 18 may generate a movement signal to move the control valve associated with swing assembly 114 to move work implement 218 relative to vertical axis 234.

Control 18 may communicate the movement signal to telemetry device 24 of remote control assembly 12 to send the movement signal to telemetry device 102 of work machine control assembly 100. (Step 304) In particular, transmitter 26 of telemetry device 24 of remote control assembly 12 may send the movement signal to receiver 104 of telemetry device 102 on work machine control assembly 100. In an exemplary embodiment, the movement signal may be send through a radio transmission using any publicly available transmission frequency. One skilled in the art will recognize that movement signal may include an identification prefix to identify the intended work machine and may be sent using any frequency hopping device commonly used to transmit a radio signal.

The received movement signal is communicated to control 108, and control 108 processes the movement signal. (Step 306). Control 108 may interpret the movement signal and make any necessary adjustments in the operation of work machine 200 to achieve the requested motion. For the swing movement signal described above, control 108 may open the control valve associated with swing assembly 114 to allow pressurized fluid to enter the hydraulic actuator associated with swing assembly 114. The force exerted by the fluid will cause swing assembly 114 to move work implement 218 relative to vertical axis 234.

As control 108 is processing movement signal, sensors 122, 124, 126, and 128 sense an operational parameter of work implement 218. (Step 308). For example, swing sensor 122 may sense a pressure indicative of the pressure of the fluid in a chamber of the hydraulic actuator associated with swing assembly 114. Swing sensor 122 may transmit an indication of the magnitude of the fluid pressure to control 108 on a constant or periodic basis. If work implement 218 rotates steadily around vertical axis 234, the sensed pressure will have a relatively constant magnitude. If, however, work implement 218 encounters an obstruction that abruptly stops movement of work implement 218, the sensed pressure in the hydraulic actuator will increase suddenly, or spike.

Control 108 receives the sensed pressures and generates a force signal. (Step 310). The force signal contains information that indicates the magnitude of force exerted by one of the hydraulic actuators associated with work implement 218 or the resultant force on work implement 218. Control 108 may send multiple force signals as the forces acting on work implement 218 change in response to different movement instructions from the operator.

Control 108 may communicate the movement signal to telemetry device 102 of work machine control assembly 100 to send the force signal to telemetry device 24 of remote control assembly 12. (Step 312) In particular, transmitter 106 of telemetry device 102 of work machine control assembly 100 may send the movement signal to receiver 28 of telemetry device 24 on remote control assembly 12.

The force signal is communicated to control 18 and control 18 causes force generator 16 to exert a corresponding feedback force on input device 14. (Step 314). The magnitude of the feedback force exerted on input device 14 by force generator 16 may be related to the force exerted by the work implement 218. For example, the feedback force exerted on input device 14 may be proportional to the force exerted by work implement 218. Alternatively, the feedback force exerted on input device 14 may be graduated, or stepped, to increase by a certain percentage as the magnitude of the force exerted by work implement 218 increases.

In the swing movement example used above, force generator 16 may exert a first magnitude of feedback force on input device 14 that corresponds to the magnitude of force required to swing work implement 218 relative to vertical axis 234. When work implement 218 contacts an obstruction that causes a pressure spike in the hydraulic actuator, the feedback force exerted by force generator 16 on input device 14 may increase proportionately.

In addition, the feedback force exerted on input device 14 may be directed to oppose the motion of the input mechanism being manipulated by the operator. In the swing movement example, the operator may move a joystick in a certain direction to cause the work implement 218 to rotate about the vertical axis 234. Force generator 16 may exert the feedback force on the joystick in the opposite direction that acts to move the joystick back to a center position. If the moving work implement 218 contacts an obstruction, the magnitude of the feedback force exerted on the joystick may increase to thereby move the joystick back to the center position. This may indicate to the user that the force required to continue moving work implement 218 in the desired is direction is greater than the maximum force that may be generated by work machine 200. In this manner, control system 10 may provide tactile feedback to a remotely located operator of work machine 200.

INDUSTRIAL APPLICABILITY

As will be apparent, the above-described control system provides tactile feedback to the operator of a remotely controlled work machine. The tactile feedback may provide the operator with information regarding the operation of the remote work machine, such as, for example, an indication of the current loads and/or forces being exerted by one or more of the hydraulic actuators associated with a work implement.

This tactile feedback may be used by the operator to adjust the operation of the work machine, to increase the efficiency of the machine, and/or to prevent incurring damage to one or more of the work machine components.

It is contemplated that the above-described control system may be used with any type of work machine. For example, the control system may be used with an excavator, a front shovel, a bulldozer, a backhoe, an articulated truck, or an off-highway truck. One skilled in the art will recognize that the principles of the present disclosure may also be applied to other applications.

It will be apparent to those skilled in the art that various modifications and variations can be made in the described system and method without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A control system for a work machine having at least one hydraulic actuator, comprising:
   an input device adapted to generate a movement signal to control the movement of the at least one hydraulic actuator;
   a first sensor operatively engaged with the at least one hydraulic actuator and adapted to a sense a parameter indicative of a magnitude of a force exerted by the hydraulic actuator;
   a first controller disposed on the work machine and adapted to control the motion of the at least one hydraulic actuator, the first controller having a first receiver adapted to receive the movement signal and a first transmitter adapted to transmit a force signal including an indication of the force exerted by the hydraulic actuator;
   a second controller operatively connected to the input device, the second controller having a second transmitter adapted to transmit the movement signal and a second receiver adapted to receive the force signal;
   a second sensor adapted to sense a parameter indicative of a magnitude of a velocity of the hydraulic actuator and wherein the first transmitter transmits a velocity signal to the second receiver; and
   a force generator operatively engaged with the input device and adapted to exert a feedback force on the input device, the magnitude of the feedback force being related to the magnitude of the force exerted by the hydraulic actuator.

2. The control system of claim 1, wherein the input device includes a joystick.

3. The control system of claim 1, wherein the force generator includes at least one of an electromagnet, a spring, and a hydraulic actuator.

4. The control system of claim 1, further including a control valve associated with the hydraulic actuator and wherein the first controller controls the position of the control valve to thereby control the movement of the hydraulic actuator.

5. The control system of claim 1, wherein the first sensor is adapted to sense a pressure indicative of the pressure of a fluid in the hydraulic actuator.

6. The control system of claim 1, wherein the magnitude of the feedback force is proportional to the magnitude of the force.

7. The control system of claim 1, wherein the force generator is adapted to exert the feedback force on the input device with a magnitude related to the magnitude of the force exerted by the hydraulic actuator and the magnitude of the velocity of the hydraulic actuator.

8. A method of remotely controlling a work machine, comprising:
   transmitting a movement signal from an input device remote from a work machine to a controller disposed on the work machine;
   moving at least one hydraulic actuator disposed on the work machine in response to the movement signal;
   sensing a parameter indicative of a magnitude of a force exerted by the at least one hydraulic actuator;
   transmitting a force signal having an indication of the magnitude of the force exerted by the at least one hydraulic actuator;
   sensing a parameter indicative of a velocity of the at least one hydraulic actuator;
   transmitting a velocity signal having an indication of the magnitude of the velocity of the at least one hydraulic actuator; and
   exerting a feedback force on the input device, the magnitude of the feedback force being related to the magnitude of the force exerted by the hydraulic actuator.

9. The method of claim 8, wherein the step of sensing a parameter indicative of a magnitude of a force includes sensing a pressure representative of a fluid pressure in the at least one hydraulic actuator.

10. The method of claim 8, further including manipulating a joystick to generate the movement signal.

11. The method of claim 8, wherein the movement of the at least one hydraulic actuator results in the movement of a work implement disposed on the work machine.

12. The method of claim 8, wherein exerting a feedback force on the input device includes exerting a feedback force with a magnitude related to the magnitude of the force exerted by the hydraulic actuator and the magnitude of the velocity of the hydraulic actuator.

13. A remote control system for a work machine system, comprising:
   a work machine having a ground engaging device, a work implement, and at least one hydraulic actuator;
   an input device adapted to generate a movement signal to control the movement of the at least one hydraulic actuator;
   a first sensor operatively engaged with the at least one hydraulic actuator and adapted to a sense a parameter indicative of a magnitude of a force exerted by the hydraulic actuator;
   a first controller disposed on the work machine and adapted to control the motion of the at least one hydraulic actuator, the first controller having a first receiver adapted to receive the movement signal and a first transmitter adapted to transmit a force signal including an indication of the force exerted by the hydraulic actuator;
   a second controller operatively connected to the input device, the second controller having a second transmitter adapted to transmit the movement signal and a second receiver adapted to receive the force signal;
   a second sensor adapted to sense a parameter indicative of a magnitude of a velocity of the hydraulic actuator and wherein the first transmitter transmits a velocity signal to the second receiver; and a force generator operatively engaged with the input device and adapted to exert a feedback force on the input device, the magnitude of the feedback force being related to the magnitude of the force exerted by the hydraulic actuator.

14. The system of claim 13, wherein the force generator includes at least one of an electromagnet, a spring, and a hydraulic actuator.

15. The system of claim 13, wherein the work machine includes a control valve adapted to control the movement of the at least one hydraulic actuator and the first controller controls the position of the control valve to thereby control the movement of the hydraulic actuator.

16. The system of claim 13, wherein the first sensor is adapted to sense a pressure indicative of the pressure of a fluid in the hydraulic actuator.

17. The system of claim 13, wherein the magnitude of the feedback force is proportional to the magnitude of the force.

18. The system of claim 13, wherein the work machine includes a work tool mounted on a work implement and a plurality of hydraulic actuators adapted to move the work implement and the work tool.

19. The system of claim 18, further including a plurality of sensors associated with the plurality of hydraulic actuators, each of the plurality of sensors adapted to sense a parameter indicative of a magnitude of a force exerted by the respective hydraulic actuator.

20. The system of claim 19, wherein the first controller is adapted to determine a magnitude and a direction of a resulting force exerted by the work implement based on the parameters sensed by each of the plurality of sensors.

21. The system of claim 18, wherein the input device includes a first input mechanism adapted to control the motion of the work implement and a second input mechanism adapted to control the motion of the ground engaging device.

22. The system of claim 13, wherein the force generator is adapted to exert the feedback force on the input device with a magnitude related to the magnitude of the force exerted by the hydraulic actuator and the magnitude of the velocity of the hydraulic actuator.

23. A control system for a work machine having at least one hydraulic actuator, comprising:

an input means for generating a movement signal to control the movement of the at least one hydraulic actuator;

a first sensing means for sensing a parameter indicative of a magnitude of a force exerted by the hydraulic actuator;

a first controlling means for controlling the motion of the at least one hydraulic actuator, the first controlling means having a first receiving means for receiving the movement signal and a first transmitting means for transmitting a force signal including an indication of the force exerted by the hydraulic actuator;

a second controlling means operatively connected to the input device, the second controlling means having a second transmitting means for transmitting the movement signal and a second receiving means for receiving the force signal;

a second sensing means for sensing a parameter indicative of a magnitude of a velocity of the hydraulic actuator and wherein the first transmitter transmits a velocity signal to the second receiver; and a means for exerting a feedback force on the input device, the magnitude of the feedback force being related to the magnitude of the force exerted by the hydraulic actuator.

* * * * *